United States Patent
Seshamani

(10) Patent No.: US 9,453,154 B2
(45) Date of Patent: Sep. 27, 2016

(54) NON-CFC REFRIGERANT MIXTURE FOR USE IN MULTISTAGE AUTO CASCADE SYSTEMS

(71) Applicant: Varadarajan Seshamani, Bangalore (IN)

(72) Inventor: Varadarajan Seshamani, Bangalore (IN)

( * ) Notice: Subject to any disclaimer, the term of this patent is extended or adjusted under 35 U.S.C. 154(b) by 0 days.

(21) Appl. No.: 14/369,754

(22) PCT Filed: Dec. 5, 2012

(86) PCT No.: PCT/IN2012/000797
§ 371 (c)(1),
(2) Date: Jun. 30, 2014

(87) PCT Pub. No.: WO2013/186784
PCT Pub. Date: Dec. 19, 2013

(65) Prior Publication Data
US 2014/0353542 A1  Dec. 4, 2014

(30) Foreign Application Priority Data
Jun. 12, 2012 (IN) .......................... 2336/CHE/2012

(51) Int. Cl.
*C09K 5/04*  (2006.01)
*F25B 9/00*  (2006.01)
*F25B 1/00*  (2006.01)

(52) U.S. Cl.
CPC .............. *C09K 5/044* (2013.01); *C09K 5/045* (2013.01); *F25B 1/005* (2013.01); *F25B 9/006* (2013.01); *C09K 2205/106* (2013.01); *C09K 2205/12* (2013.01); *C09K 2205/122* (2013.01); *C09K 2205/13* (2013.01); *C09K 2205/132* (2013.01); *C09K 2205/40* (2013.01)

(58) Field of Classification Search
CPC .......................... C09K 5/044; C09K 2205/122
See application file for complete search history.

(56) References Cited

U.S. PATENT DOCUMENTS

| | | | |
|---|---|---|---|
| 5,644,502 A * | 7/1997 | Little | 700/266 |
| 5,702,632 A | 12/1997 | Weng | |
| 6,041,621 A * | 3/2000 | Olszewski et al. | 62/613 |
| 6,076,372 A * | 6/2000 | Acharya et al. | 62/606 |
| 6,481,223 B2 * | 11/2002 | Flynn et al. | 62/114 |
| 6,631,625 B1 | 10/2003 | Weng | |
| RE40,627 E | 1/2009 | Podtchereniaev et al. | |
| 2001/0042379 A1 | 11/2001 | Flynn et al. | |
| 2005/0086950 A1* | 4/2005 | Khatri | 62/114 |
| 2005/0103028 A1 | 5/2005 | Weng | |
| 2007/0000261 A1* | 1/2007 | Flynn et al. | 62/114 |

* cited by examiner

*Primary Examiner* — John Hardee
(74) *Attorney, Agent, or Firm* — Innovation Capital Law Group, LLP; Vic Lin

(57) ABSTRACT

A refrigerant mixture for use in multistage auto cascade ultralow and cryogenic temperature refrigeration systems. Particularly, the present invention relates to a refrigerant mixture comprising one hydrochlorofluorocarbon (HCFC) and the major proportion includes hydrofluorocarbons (HFC), fluorocarbons, hydrocarbons and natural gases. More particularly, the present invention relates to non-flammable, non-toxic refrigerant mixture having no chlorofluorocarbon (CFC). Further, the present invention aims in providing a refrigerant mixture having low Ozone Depleting Potential (ODP) combined with low Global Warming Potential (GWP).

7 Claims, No Drawings

NON-CFC REFRIGERANT MIXTURE FOR USE IN MULTISTAGE AUTO CASCADE SYSTEMS

FIELD OF INVENTION

The present invention relates to a refrigerant mixture for use in multistage auto cascade ultralow and cryogenic temperature refrigeration systems. Particularly, the present invention relates to a refrigerant mixture comprising one hydrochlorofluorocarbon (HCFC) and the major proportion includes hydrofluorocarbons (HFC), fluorocarbons, hydrocarbons and natural gases. More particularly, the present invention relates to non-flammable, non-toxic refrigerant mixture having no chlorofluorocarbon (CFC). Further, the present invention aims in providing a refrigerant mixture having low Ozone Depleting Potential (ODP) combined with low Global Warming Potential (GWP).

BACKGROUND ART

In auto cascade cryogenic cooling systems with multiple auto cascade stages, refrigerant gas mixes are used as the refrigerant, comprising component fluids to refrigerate in different stages of the auto cascade. The component fluids work at different refrigerant boiling temperature bands for each auto cascade stage. Such fluids are typically a mix of CFC, HFC, HCFC, fluorocarbons, hydrocarbons and natural gases. The utilization of such refrigerant mixes in auto cascade systems enables the achievement of ultra-low temperatures with good cooling performance.

Most refrigerant fluid mixes that work effectively using components with CFCs and/or HCFCs may be toxic, flammable, having high ODP and may have high global warming potential; all of which are factors that inhibit the increase of use of such mixes. Environmental concern over the accelerating deleterious effects on the ozone layer of the atmosphere has resulted in efforts in the industry to substantially reduce the use of CFC refrigerants. In some of the refrigerant mixes presently in use, two or more HCFC components are used, resulting in high ODP.

Adoption of non-CFC refrigerant mixtures and reduction of HCFC refrigerant components, faces difficulties in use such as discharge temperatures and pressures tending to be higher than desirable, causing lubricant carry-over and system problems; compressors typically run hot because of insufficient cooling, lubricants need change to enable proper performance and most mixtures are not drop-in replacements.

In other created refrigerant mixes the proportions of flammable and toxic gases, are high and could constitute cause for concern in regular use, mainly because of possible leaks in use and maintenance. Several prior arts are discussed hereunder:

U.S. Pat. No. 5,702,632 titled "Non-CFC refrigerant mixture" describes a refrigeration heat exchanger section useful in circulating a substantially non-CFC refrigerant mixture. However, the above invention uses a high proportion of a refrigerant that is quite flammable and uses R-142b, which is a CFC having high ODP and GWP.

U.S. Pat. No. 6,631,625 titled "Non-HCFC refrigerant mixture for an ultra-low temperature refrigeration system" describes a method and apparatus for a refrigeration heat exchanger section useful in circulating a substantially non-HCFC refrigerant mixture. However, this refrigerant mixture is mainly a refrigerant blend free of R-22 for use in ultralow temperature refrigeration meant for machines that use POE oils and cannot be used in older machines that use Alkylbenzene oils.

US 20010042379 titled "Refrigerant blend free of R-22 for use in ultralow temperature refrigeration" describes refrigerants containing R-22 replaced with new blends by using R-125 with R-124 and R-123, or R-125 with R-124 and R-218, or R-218 with R-124, in place of R-22. However, the above formulation contains more than one HCFC and has a high GWP.

US 20050103028 titled "Non-CFC refrigerant mixture for an ultra-low temperature refrigeration system" describes method and apparatus for a refrigeration heat exchanger section useful in circulating a substantially non-CFC refrigerant mixture. However, the above invention uses a high proportion of a refrigerant that is quite flammable. The component R-142b used in the above invention is a CFC, having high ODP and GWP.

US RE40627 titled "Nonflammable mixed refrigerants (MR) for use with very low temperature throttle-cycle refrigeration systems" describes refrigerants containing HCFC's replaced with new blends by using R-236fa and R-125, or R-125 with R-245fa, or R-236ea, or R-134a with R-236fa in place of HCFC's. However, the refrigerant mix of the above invention can be used only in auto cascade machines that use POE oils and are not a drop in replacement for machines using alkylbenzene oils.

Accordingly, there exists a need to provide a refrigerant mixture with very low ozone depletion potential combined with low global warming potential. The present invention aims at providing non-flammable, non-toxic refrigerant mixture having no CFC. In addition, there is a need to provide a refrigerant mixture that uses commercially available gases and which is compatible with most of the standard refrigeration oils and compressor materials.

OBJECTS OF THE INVENTION

One or more problems of the prior art may be overcome by the various embodiments of the present invention.

It is the primary object of the present invention to provide a refrigerant mixture for use in multistage auto cascade ultralow and cryogenic temperature refrigeration systems.

It is another object of the present invention to provide a refrigerant mixture comprising one hydrochlorofluorocarbon (HCFC) and with the major proportion including hydrofluorocarbons (HFC), fluorocarbons, hydrocarbons and natural gases.

It is another object of the present invention to provide a refrigerant mixture having no chlorofluorocarbon (CFC).

It is another object of the present invention to provide a non-chlorofluorocarbon refrigerant mixture that is non-flammable and non-toxic.

It is another object of the present invention to provide a refrigerant mixture having very low ozone depletion potential combined with low global warming potential.

It is another object of the present invention, wherein the refrigerant mixture uses a maximum of only one HCFC component.

It is another object of the present invention, wherein the HCFC used has only one Chlorine atom in the molecule.

It is another object of the present invention, wherein the refrigerant mixture provides refrigeration through an auto cascade system of two or more stages for obtaining high temperature difference refrigeration down to ultralow/cryogenic temperatures.

It is another object of the present invention, wherein the refrigerant mixture enables the achievement of cooling to a range of −130 degree Celsius to −160 degree Celsius.

It is another object of the present invention, wherein the refrigerant mixture enables a proper balancing of refrigerant flows and provides the necessary cooling capability of the refrigerants to the compressor.

It is another object of the present invention, wherein the refrigerant mixture is capable of delivering good and comparable performance in current auto cascade machines irrespective of the lubricant and type of machine used.

It is another object of the present invention, wherein the refrigerant mixture is chemically stable, uses commercially available gases and is compatible with most of the standard refrigeration oils and compressor materials.

It is another object of the present invention, wherein the refrigerant mixture has ozone depletion potential between 0.005 and 0.007 combined with global warming potential in the range of 3500 to 4300.

SUMMARY OF THE INVENTION

Thus according to the basic aspect of the present invention there is provided a non-chlorofluorocarbon (CFC) refrigerant mixture for use in multistage auto cascade systems comprising:
One hydrochlorofluoro carbon (HCFC);
Hydrofluorocarbons (HFC);
Fluorocarbons;
Hydrocarbons; and
Natural gases.

In another aspect of the invention there is provided a non-chlorofluorocarbon (CFC) refrigerant mixture for use in multistage auto cascade systems comprising:
At least four refrigerants from group consisting of high temperature boiling fluid components;
At least two refrigerants from group consisting of low temperature boiling fluid components; and
At least two refrigerants from group consisting of cryo temperature boiling refrigerant fluid components.

It is another aspect of the present invention, wherein the high temperature boiling fluid components comprise of:

|  | Gases | Range of Content |
|---|---|---|
| (i) | R-124 | 20%-30% by weight; |
| (ii) | R-227ea | 15%-35% by weight; |
| (iii) | R-236fa | 15%-35% by weight; |
| (iv) | R-600 | 1%-3% by weight; |
| (v) | R-600a | 1%-3% by weight; |
| (vi) | R-134a | 10%-20% by weight; and |
| (vii) | R-125 | 10%-20% by weight. |

It is another aspect of the present invention, wherein the low temperature boiling fluid components comprise of:

|  | Gases | Range of Content |
|---|---|---|
| (i) | R-116 | 0%-8% by weight; |
| (ii) | R-744 | 0%-6% by weight; |
| (iii) | R-23 | 5%-10% by weight; and |
| (iv) | R-170 | 2%-4% by weight. |

It is another aspect of the present invention, wherein the cryo temperature boiling refrigerant fluid components comprise of:

|  | Gases | Range of Content |
|---|---|---|
| (i) | Krypton | 5%-15% by weight; |
| (ii) | Argon | 5%-15% by weight; |
| (iii) | R-14 | 5%-30% by weight; and |
| (iv) | Nitrogen | 5%-10% by weight. |

It is another aspect of the present invention, wherein the refrigerant mixture is non-flammable and non-toxic.

It is another aspect of the present invention, wherein the refrigerant mixture has an ozone depletion potential (ODP) between 0.005 and 0.007.

It is another aspect of the present invention, wherein the refrigerant mixture has global warming potential (GWP) between 3500 and 4300.

It is another aspect of the present invention, wherein the refrigerant mixture is capable of functioning in both systems which use alkylbenzene or polyol-ester oils.

It is another aspect of the present invention, wherein the refrigerant mixture is used to achieve refrigerating temperature between −130 degree Celsius and −160 degree Celsius.

It is another aspect of the present invention, wherein the refrigerant mixture is used to achieve compressor operating temperature below 28 degree Celsius.

In yet another aspect of the present invention there is provided a multistage auto cascade system used in circulating a non-chlorofluorocarbon (CFC) refrigerant mixture comprising:
Compressor;
One or more condensers;
Heat exchanger;
Separator; and
Evaporator,
wherein there are two or more auto cascade stages,
wherein the refrigerant mixture is compressed as a single mix in the compressor,
wherein the refrigerant mixture is delivered as a single mix to the condenser,
wherein liquid fraction is cooled by heat exchanger after each capillary expansion stage,
wherein in each stage the refrigerant mixture is separated into lower mixture and condensed, and
wherein in the final auto cascade stage, the refrigerant mixture is further passed through the evaporator to achieve the target temperature.

It is another aspect of the present invention, wherein the separated high temperature fluid refrigerant fractions are returned to the compressor.

It is another aspect of the present invention, wherein the residual refrigerant mixture is returned to the compressor.

DETAILED DESCRIPTION OF THE INVENTION

As already described, the invention is directed towards a refrigerant mixture for use in multistage auto cascade low temperature refrigeration systems (ultralow and cryogenic temperature refrigeration systems). The refrigerant mixture of the present invention comprises one hydrochlorofluorocarbon (HCFC) and major proportion includes hydrofluorocarbons (HFC), fluorocarbons, hydrocarbons and natural gases. The refrigerant mixture contains no chlorofluorocarbon (CFC) and uses only one HCFC component having one chlorine atom in molecule along with the remaining components.

The term 'hydrocarbons' (HC) as used herein in this application refers to hydrogen ($H_2$), methane ($CH_4$), ethane ($C_2H_6$), ethene ($C_2H_4$), propane ($C_3H_8$), propene ($C_3H_6$), butane ($C_4H_{10}$) and cyclobutane ($C_4H_8$). The term 'natural gases' as used herein in this application refers to nitrogen ($N_2$), argon (Ar), carbon dioxide ($CO_2$), helium (He), krypton (Kr), oxygen ($O_2$) neon (Ne), and xenon (Xe). The term 'cryogenic temperature' as used herein in this application refers to a temperature of 150° K or less (−123 degree Celsius or less). The term 'low-ozone-depleting' as used herein in this application refers to an ozone depleting potential less than 0.15 as defined by the Montreal Protocol convention, wherein dichlorofluoromethane ($CCl_2F_2$) has an ozone depleting potential of 1.0. The term 'non-flammable' as used herein in this application refers to high flash point of at least 600° K or no flash point. The term 'non-toxic' as used herein in this application refers to not posing an acute or chronic hazard when handled in accordance with acceptable exposure limits. The term 'normal boiling point' as used herein in this application refers to the boiling temperature at 1 standard atmosphere pressure, i.e. 14.696 pounds per square inch absolute. The standard international designation: 'R-XXX', has been used for refrigerant gases throughout this document.

The present invention aims to create a refrigerant mixture, which can provide refrigeration through an auto cascade system of three or more stages, for obtaining high temperature difference refrigeration down to ultralow/cryogenic temperatures. The refrigerant mixture has been finely tuned with the minimum of HCFC proportion, yet enabling a proper balancing of refrigerant flows and providing the necessary cooling capability of the refrigerants to the compressor. The refrigerant mixture is non-toxic, non-flammable, has a low Ozone Depletion Potential (ODP) of between 0.005 and 0.007 and a low Global Warming Potential (GWP) ranging from 3500 to 4300. All these have been achieved by eliminating the use of CFCs and using a maximum of only one HCFC component in the refrigerant mixture.

The formulation of refrigerant mixture contains the following gases in the weight proportions as shown below:

Group A: High Temperature Boiling Fluids

|       | Gases   | Range of Content |
|-------|---------|------------------|
| (i)   | R-124   | 20%-30%          |
| (ii)  | R-227ea | 15%-35%          |
| (iii) | R-236fa | 15%-35%          |
| (iv)  | R-600   | 1%-3%            |
| (v)   | R-600a  | 1%-3%            |
| (vi)  | R-134a  | 10%-20%          |
| (vii) | R-125   | 10%-20%          |

Group B: Low Temperature Boiling Fluids

|       | Gases  | Range of Content |
|-------|--------|------------------|
| (i)   | R-116  | 0%-8%            |
| (ii)  | R-744  | 0%-6%            |
| (iii) | R-23   | 5%-10%           |
| (iv)  | R-170  | 2%-4%            |

Group C: Cryo Temperature Boiling Refrigerant Fluids

|       | Gases    | Range of Content |
|-------|----------|------------------|
| (i)   | Krypton  | 5%-15%           |
| (ii)  | Argon    | 5%-15%           |
| (iii) | R-14     | 5%-30%           |
| (iv)  | Nitrogen | 5%-10%           |

The refrigerant mixture of the present invention comprises:
(a) 4 or more refrigerants from the group consisting of high temperature boiling fluid components;
(b) 2 or more refrigerants from the group consisting of low temperature boiling fluid components; and
(c) 2 or more refrigerants from the group consisting of cryo temperature boiling refrigerant fluid components.

The refrigerant mixture is a drop-in replacement for refrigerant gas mixtures in use in auto cascade systems. The refrigerant mixture is non-toxic, chemically stable, uses commercially available gases and is compatible with most of the standard refrigeration oils and compressor materials. This new refrigerant mix has only one component with an ODP factor above '0' i.e., a HCFC, comprising a minor part of the formulation. With this unique feature, the refrigerant mixture has achieved a low ODP and low GWP.

The refrigerant mixture is a new and unique gas mixture for multistage auto cascade ultra-low and cryogenic temperature refrigeration. The refrigerant mixture is capable of delivering good and comparable performance in current auto cascade machines, irrespective of the lubricant used and irrespective of whether the machine is designed to use refrigerant with CFC or non-CFC mixtures. The refrigerant mixture also shows good performance in machines designed for HCFC, HFC and fluorocarbon refrigerants.

The refrigerant mixture is used in machines that have the following method for generating refrigeration: initial compression of the refrigerant mixture, cooling the compressed refrigerant mixture to produce a cooled compressed refrigerant mixture, expanding the cooled compressed refrigerant mixture and generating refrigeration to produce a lower temperature refrigerant mixture comprising part of the starting mix, while simultaneously warming the lower temperature refrigerant mixture, repeating the expansion process successively until the lowest gas fraction is arrived at and returning the warmed cascade gases to the compressor.

Another aspect of the present invention is to provide a multistage auto cascade system used in circulating a non-chlorofluorocarbon refrigerant mixture. The refrigerant mixture is compressed as a single mix in the refrigeration compressor and thereafter goes through a condenser, followed by three or more auto cascade stages. The liquid fraction is cooled by heat exchanger after each capillary expansion stage. The initial refrigerant blend would separate in each stage into successively lower sub-blends that condense in each respective stage within a reasonably narrow temperature band of the applicable stage. The separated high temperature fluid refrigerant fraction or fractions are returned to the compressor, upon completion of their respective stage heat exchange. The final auto cascade stage would carry the coldest gas component or mix and would be passed through the evaporator, thus cooling it to the target temperature for the required process that requires cooling. The residual final stage refrigerant would return to the compressor after being warmed, as a result of the target cooling load, thus closing the refrigerant circuit.

The utilization of this invention in present day auto cascade cryo cooling equipments enables the achievement of operational temperatures, pressures and refrigeration capacities comparable to that using current refrigeration mixture in the same auto cascade equipments, without any hardware changes. The refrigerant mixture of the present invention is also capable of functioning in machines, which use Alkyl-benzene as well as Polyol-ester oils. The invention enables the achievement of cooling to a range of −130 degree Celsius to −160 degree Celsius.

The present invention enables the user to obtain various benefits such as, no change in refrigeration hardware, a good temperature pull down rate can be obtained, lubricant change is not required, drop in replacement of refrigerant, operate a cool compressor with an operating temperature below 28 degree Celsius, obtain equivalent machine performance to that using conventional CFC refrigerant mix and usage of refrigerant with a low ODP and low GWP.

This invention is useful in areas such as cooling of cryocoils for vacuum chambers, cooling of cryofreezer chambers, cooling of gas streams in scientific processes, cooling of air streams in cryosurgery, cryogenic liquid container cooling, air liquefaction, low temperature grinding of plastics and spics, food freezing and freeze-drying.

The above features of the new formulation enable substantial extension of the operating life of a large population of old and current auto cascade equipments.

I claim:

1. A non-chlorofluorocarbon (CFC) refrigerant mixture for use in multistage auto cascade ultralow and cryogenic temperature refrigeration systems, containing only one hydrochlorofluoro carbon (HCFC) component, the refrigerant mixture comprising:

(i) At least four refrigerants selected from the group consisting of:

|  | Gases | Range of Content |
| --- | --- | --- |
| (i) | R-124 | 20%-30% by weight; |
| (ii) | R-227ea | 15%-35% by weight; |
| (iii) | R-236fa | 15%-35% by weight; |
| (iv) | R-600 | 1%-3% by weight; |
| (v) | R-600a | 1%-3% by weight; |
| (vi) | R-134a | 10%-20% by weight; and |
| (vii) | R-125 | 10%-20% by weight. |

(ii) At least two refrigerants, present in the refrigerant mixture, selected from the group consisting of:

|  | Gases | Range of Content |
| --- | --- | --- |
| (i) | R-116 | 0%-8% by weight; |
| (ii) | R-744 | 0%-6% by weight; |
| (iii) | R-23 | 5%-10% by weight; and |
| (iv) | R-170 | 2%-4% by weight. | and
(iii) At least two refrigerants selected from the group consisting of:

|  | Gases | Range of Content |
| --- | --- | --- |
| (i) | Krypton | 5%-15% by weight; |
| (ii) | Argon | 5%-15% by weight; |
| (iii) | R-14 | 5%-30% by weight; and |
| (iv) | Nitrogen | 5%-10% by weight. | wherein R-134a and R-125 works at both first and second stages of the multistage auto cascade system, wherein the refrigerant mixture has an ozone depletion potential between 0.005 and 0.007 combined with global warming potential in the range of 3500 to 4300 by eliminating the use of CFCs and using only one HCFC component, wherein the refrigerant mixture operates a compressor of the multistage auto cascade system with an operating temperature below 28 degree Celsius thereby controlling high discharge temperatures and high initial discharge pressures, and wherein the 4 compounds from (i), the 2 compounds from (ii) and the 2 compounds from (iii) make up 100% of the refrigerants in the refrigerant mixture.

2. The non-chlorofluorocarbon (CFC) refrigerant mixture as claimed in claim 1 wherein the refrigerant mixture provides refrigeration through multistage auto cascade system for obtaining refrigeration down to ultralow and cryogenic temperatures.

3. The non-chlorofluorocarbon (CFC) refrigerant mixture as claimed in claim 1 wherein the refrigerant mixture is non-flammable and non-toxic.

4. The non-chlorofluorocarbon (CFC) refrigerant mixture as claimed in claim 1, wherein the refrigerant mixture functions in both systems which use alkylbenzene or polyolester oils.

5. The non-chlorofluorocarbon (CFC) refrigerant mixture as claimed in claim 1, wherein the multistage auto cascade system operating with the refrigerant mixture delivers refrigerating temperature between −130 degree Celsius and −160 degree Celsius.

6. The non-chlorofluorocarbon (CFC) refrigerant mixture as claimed in claim 1, which is universally developed for auto cascade systems irrespective of lubricant used in the systems, whether alkylbenzene or polyolester oils.

7. A non-chlorofluorocarbon (CFC) refrigerant mixture comprising:

(i) at least four refrigerants selected from the group consisting of:

| Gases | Range of Content |
| --- | --- |
| R-124 | 20%-30% by weight; |
| R-227ea | 15%-35% by weight; |
| R-236fa | 15%-35% by weight; |
| R-600 | 1%-3% by weight; |
| R-600a | 1%-3% by weight; |
| R-134a | 10%-20% by weight; and |
| R-125 | 10%-20% by weight, |

(ii) at least two refrigerants, present in the refrigerant mixture, selected from the group consisting of:

| Gases | Range of Content |
| --- | --- |
| R-116 | 0%-8% by weight; |
| R-744 | 0%-6% by weight; |
| R-23 | 5%-10% by weight; and |
| R-170 | 2%-4% by weight; and |

(iii) at least two refrigerants selected from the group consisting of:

| Gases | Range of Content |
| --- | --- |
| Krypton | 5%-15% by weight; |
| Argon | 5%-15% by weight; |

-continued

| Gases | Range of Content |
|---|---|
| R-14 | 5%-30% by weight; and |
| Nitrogen | 5%-10% by weight, | wherein the refrigerant mixture contains only one hydrochlorofluorocarbon (HCFC) component, and
wherein the 4 compounds from (i), the 2 compounds from (ii) and the 2 compounds from (iii) make up 100% of the refrigerants in the refrigerant mixture.

* * * * *